United States Patent [19]

Mason et al.

[11] Patent Number: 4,518,467

[45] Date of Patent: May 21, 1985

[54] SELECTIVE SOLAR SURFACES

[75] Inventors: John J. Mason, Walsall; Michael T. Cunningham, Harbourne; Jeffrey N. Crosby, Melksham, all of England

[73] Assignee: INCO Selective Surfaces Limited, Birmingham, England

[21] Appl. No.: 633,198

[22] Filed: Jul. 23, 1984

Related U.S. Application Data

[63] Continuation-in-part of Ser. No. 382,172, May 26, 1982, abandoned.

[30] Foreign Application Priority Data

Jun. 1, 1981 [GB] United Kingdom ............... 8116642
Apr. 14, 1982 [GB] United Kingdom ............... 8210803

[51] Int. Cl.$^3$ ............................ C23B 5/06; C23F 7/26
[52] U.S. Cl. ................................ 204/37.1; 204/38.1; 428/469; 126/901
[58] Field of Search ............ 204/38.1, 37.1; 428/469; 126/901; 148/6.21

[56] References Cited

U.S. PATENT DOCUMENTS

| | | | |
|---|---|---|---|
| 1,988,012 | 1/1935 | Mason | 148/6.21 |
| 4,097,311 | 6/1978 | Ishibashi | 148/6.21 |

FOREIGN PATENT DOCUMENTS

| | | | |
|---|---|---|---|
| 2850134 | 5/1979 | Fed. Rep. of Germany | 126/901 |
| 1305636 | 2/1973 | United Kingdom . | |
| 1341220 | 12/1973 | United Kingdom . | |
| 1377079 | 12/1974 | United Kingdom . | |
| 1402184 | 8/1975 | United Kingdom . | |
| 1435518 | 5/1976 | United Kingdom . | |

OTHER PUBLICATIONS

Evans et al., *The Nature of the Film on Coloured Stainless Steel*, Trans. I.M.F. 51 (1973).

Primary Examiner—John F. Niebling
Attorney, Agent, or Firm—Edward A. Steen; Raymond J. Kenny

[57] ABSTRACT

A process for the production of a solar collector for high temperature use by forming a porous oxidic film of less than 0.5 μm thickness on to a stainless steel surface, said film comprising a tortuous network of interlinking pathways, and by depositing nickel or palladium into the pores by a DC electrolysis process.

6 Claims, 1 Drawing Figure

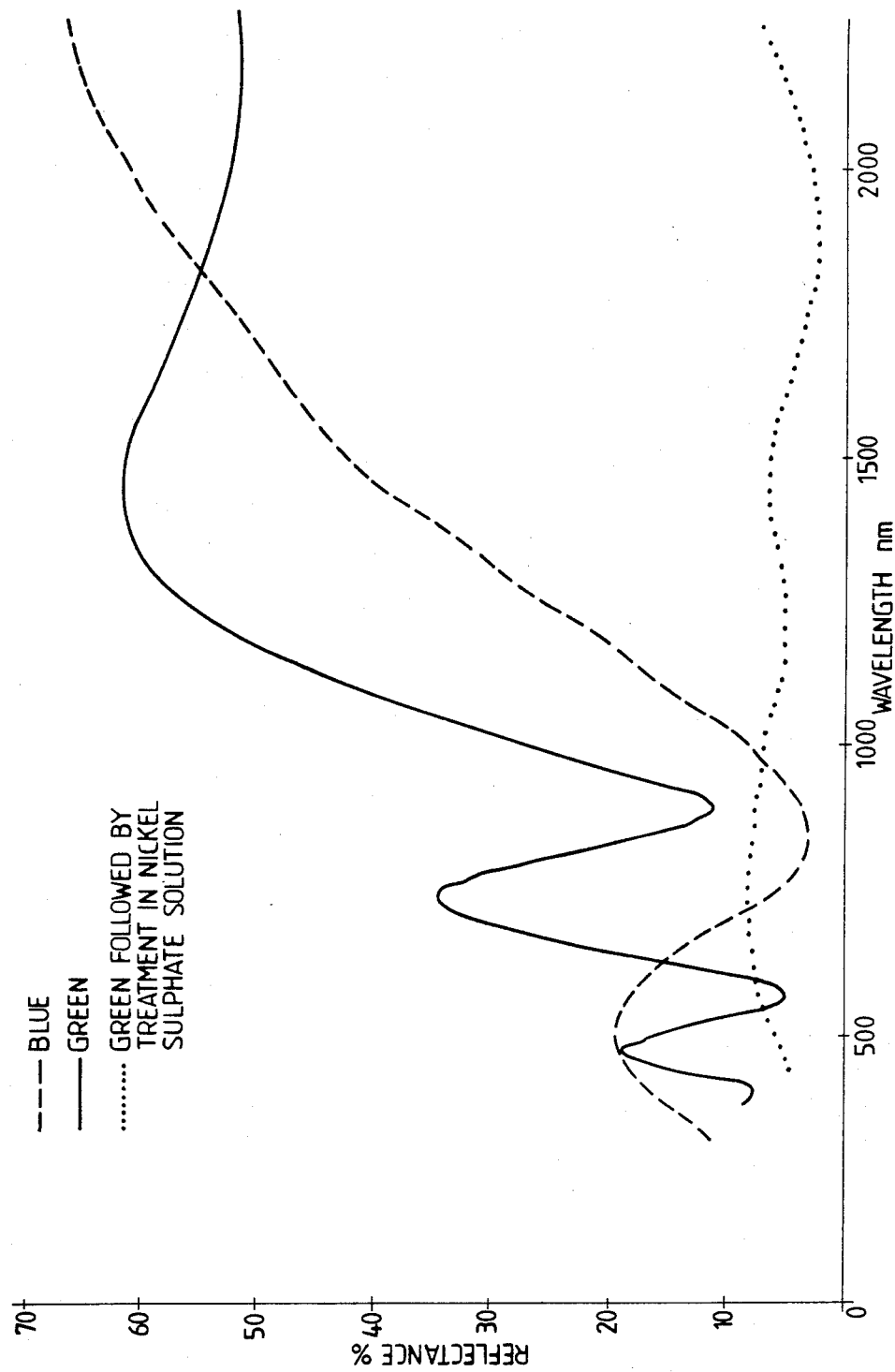

SELECTIVE SOLAR SURFACES

This is a continuation-in-part of Ser. No. 382,172, filed May 26, 1982, abandoned.

The present invention relates to a process for improving the selective properties of a corrosion resistant chromium-containing alloy which has been immersion treated to develop a coloured oxidic surface layer.

UK Pat. Nos. 1 305 636, 1 377 079, 1 341 220, 1 420 184, 1 435 518 and 1 436 150 disclose processes, developed by Inco Europe Limited and known as the Inco process, for forming a hardened oxide film on stainless steel in a range of colours for a decorative finish. In the paper by T E Evans, A C Hart and A N Skedgell, Trans. Inst. Met. 51 108, 1973, reflectance spectra of several colours are given and these demonstrate quite good solar absorptance and high reflectance into the near infra red. Subsequently values of absorptance of the order of 0.90 to 0.95 have been quoted for coloured stainless steel. Such values have been obtained by relatively simple laboratory techniques, which apparently bias the results. When tested by the method described in ASTM Standard E 424-71 by which AM2 solar radiation is calculated from reflectance spectra using a 20 selected ordinate method, we have found that typical coloured stainless steel panels have an AM2 absorptance in the range 0.86 to 0.925 when determined by the ASTM method.

Although coloured stainless steel has many desirable properties for use in solar collectors, such as good resistance to atmospheric corrosion and high performance under accelerated corrosion and stagnation tests, as well as excellent formability, the values of about 0.9 are lower than desirable when compared to values obtained using matt paints and other competitive surfaces.

It has been found that the thermal stability of coloured stainless steel is adequate for flat plate collectors where operating temperatures do not normally exceed 100° C., but can occasionally be subjected to exposures to 200° C. for short periods. However the thermal stability of conventional coloured stainless steel is not suitable for concentrating (focussed) collectors which operate in the temperature range 300°-300° C. depending on the concentration ratio.

By contrast to the oxidic surfaces which can be formed on stainless steel, the oxidic surfaces which can be formed on aluminium by electrolytic treatment, i.e. anodized aluminium, have no selective properties per se. UK Pat. No. 1 523 843 (Dornier) discloses a solar collector made from anodised aluminium, in which the pores are substantially parallel sided, in which metal is electrolytically deposited into the pores so that it forms 'metal rods' upstanding from the pores. The aluminium oxide layer is less than 1 $\mu$m thick having pores spaced from 0.1 to 1$\mu$ apart, pore diameters being from 0.1 to 0.5 $\mu$m. UK Patent application No. 2 009 793 (Granges Aluminium) discloses a modification of this system in which the aluminium oxide is up to 1.5 $\mu$m thick, and contains substantially parallel sided pores containing metal, the pores being located less than 0.1 $\mu$m apart and having a pore diameter of less than 0.08 $\mu$m. The metal elements are located at the bottom of the pores, the top being sealed to deposit more oxide on the surface of the metal. Granqvist et al (Appl. Phys. Lett. 35(3) Aug. 1, 1979) has examined such selective surfaces and found that they comprise a series of distinct layers. The layer closest to the aluminium surface is compact $Al_2O_3$ with a thickness of about 10 nm. On top of this is a layer of porous alumina of about 0.3 $\mu$m containing 25 vol % metallic nickel as particles occluded in the oxide. A further 0.4 $\mu$m of porous alumina is located on top of the nickel containing layer.

The present invention is based on the discovery that the selective properties of the oxide film on stainless steel can be improved to give solar collectors having superior properties to those of pigmented anodised aluminium collectors.

According to the present invention a process for the production of a solar collector for operation at temperatures in the range of 100° to 300° C. or more comprises immersing a stainless steel plate in a solution of chromic acid and sulphuric acid, with or without other constituents, at a temperature of about 65° C. or more, to give a coloured heavily hydrated chromium-rich spinel oxide surface film of thickness of from about 0.02 to about 0.5 $\mu$m, said surface film comprising a tortuous network of interlinking pathways of effective length of about twice the film thickness, washing and drying the surface and subjecting it to DC electrolysis in a bath selected from the group comprising a nickel plating bath and a palladium plating bath, said electrolysis continuing for a time sufficient to deposit metal into the pores and thereby effect a colour change of the oxide film but insufficient for metal to be deposited on the surface of the film.

By stainless steel as used herein is meant a corrosion resistant chromium-containing iron alloy. The stainless steel to be used in the process preferably has a mirror finish, for example as produced by a bright anneal process. However good results may also be obtained on matt finish surfaces.

"Hardness" tests, which comprise rubbing the film with a type eraser in "pencil" form, loaded with a 400 g weight, have demonstrated that the process of the invention may increase the hardness of the film, and this may be sufficient to enable the handling of sheets of coloured stainless steel treated by the present process, and subsequent assembly into solar panels. Should higher levels of hardness be required however, the films can be further hardened by the processes described in U.K. Pat. No. 1 377 079 and U.K. Pat. No. 1 435 518. This further treatment has no deleterious effect on the optical or thermal stability properties of the steel but produces levels of hardness similar to those attainable on coloured films on stainless steel not having been treated by the process of the present invention. It is important that these further hardening processes are applied after the process of the present invention since the present process cannot be applied to films which have already been hardened.

Proprietory nickel plating baths and palladium plating baths may be used in processes of the present invention. However plating baths from which metal oxides are deposited must not be used.

Particularly useful results have been obtained using an electrolyte comprising nickel sulphate, ammonium sulphate, boric acid and water. Alternatively a Watts-type nickel plating solution may be used such as nickel sulphate, nickel chloride and boric acid. These baths can be used over a range of current densities, typically in the range 1 to 5 mA/cm$^2$. The process of the invention gives improved absorptance when applied to films on both austenitic and ferritic stainless steels and also on different surface finishes.

The electrolysis stage of the present invention modifies the reflectance spectra of the film and this is visible as a modification in both the colour, its intensity and shade. This is not, however, to be confused with the colour advancement, proceeding in the colour series brown, blue, gold, magenta, peacock and green, which is produced by increasing the thickness of the interference film. Thus whereas the film thickness of the bronze coloured surface is about 0.02 μm thick, that of the green is about 0.36 μm or more. However after electrolysis of these samples, although the colour is effected, the thickness is unaffected.

When nickel is deposited into the pores of a sample initially coloured green a surface coloured bronze, dark blue or even magenta may be produced which has an absorptance level (AM2) of an excess of 0.9 but the thickness is unaffected. This may be illustrated by reference to the accompanying drawing FIG. 1 which shows the reflectance spectra of a typical sample of blue coloured stainless steel, previously considered to be best coloured stainless steel surface for solar absorptance with that of a sample coloured green and that of a sample initially coloured green and subsequently treated by a process in accordance with the invention. It will be seen that the advancement from blue to green is associated with a shift in spectra to longer wavelengths as would be expected by interference effects associated with increasing film thickness. By contrast, the modification resulting from the process of the present invention is no longer a simple interference spectrum. It will be observed that the low reflectance is maintained well into the near infra red.

We have found that the process of the invention is preferably applied to thicker interference films, for example magenta, peacock and green, with the maximum around peacock for Type 304 steel. However $\alpha$ max values are not critically sensitive to initial film thicknesses so there is some latitude on control of colouring potential in production. These thicker films do not necessarily have to require longer process times for their production than for the thinner blue film which hitherto has been preferred for solar applications, since the colour may be produced in a bath operating at a rather higher temperature than is conventionally used, e.g. at 90° C. instead of 85° C.

Thermal stability tests have shown that thicker interference films e.g. green, treated by the process of the present invention have excellent thermal stability, and that some surfaces actually show an increase in absorptance after 10 days at 300° C. However the thermal stability of thin films treated by the process of the present invention, i.e. thinner than dark gold, may not be significantly improved.

Some samples of surfaces produced by the present process have been subjected to thermal stability tests at 400° C., and have survived this test surprisingly well, particularly those in which the deposited metal was palladium.

Some examples will now be described.

EXAMPLE 1

Two batches of Type 304 austenitic stainless steel having a mirror finish were treated by the Inco colouring process to gold and green respectively. The samples were then arranged as cathodes in plating baths containing a plating solution the following composition (in g/l):

| | |
|---|---|
| nickel sulphate | 25 |
| magnesium | 20 |
| boric acid | 25 |
| ammonium sulphate | 15 |
| aluminium sulphate | 0.5 |

The current density was 1.2 mA/cm² (DC).

Different samples from each batch were left in the plating solution for different lengths of time. They were then washed and dried and the solar absorptance of each sample was measured for AM2 solar radiation by calculation from reflectance spectra using the 20 selected ordinate method given in Appendix A2 of ASTM Standard E424-71. The results were as follows:

| Time in plating solution (mins) | Solar absorptance (AM2) |
|---|---|
| Batch 1 - Initial colour gold | |
| 1.5 | 0.809 |
| 2 | 0.900 |
| 3 | 0.894 |
| 4 | 0.904 |
| 4.5 | 0.902 |
| Batch 2 - Initial colour green | |
| 1.5 | 0.826 |
| 2.5 | 0.856 |
| 3 | 0.877 |
| 3.5 | 0.910 |
| 4 | 0.925 |

The thermal emittance of the samples before and after plating was in the range from 0.15 to 0.19.

EXAMPLE 2

A sample of Type 304 steel finish was initially oxidised to a green colour and treated in the nickel sulphate solution used in Example 1 at 1.2 mA/cm². The results obtained were as follows:

| Time in plating solution (mins) | Solar absorptance (AM2) |
|---|---|
| 3 | 0.919 |
| 4 | 0.934 |
| 6 | 0.949 |
| 10 | 0.957 |

After 10 minutes nickel started to plate over the surface of the steel thereby reducing absorptivity. Thermal emittance of the samples was 0.19.

EXAMPLE 3

A sample of Type 444 bright annealed stainless steel was initially oxidised to green and treated in the nickel sulphate solution used in Example 1 at 1.2 mA/cm². The results obtained were as follows:

| Time in plating solution (mins) | Solar absorptance (AM2) |
|---|---|
| 5 | 0.93 |
| 6 | 0.94 |

Total hemispherical emissivity of the samples was 0.19.

The results from these examples suggest that finishes other than mirror polish give higher solar absorptances, the best value obtained for a mirror-finished steel being 0.92. However higher absorptance of mill finished steel is slightly offset by the higher thermal emissivities obtained, e.g. 0.19 as against 0.10 to 0.15 for mirror finish. The results also demonstrate that the process of the invention may be successfully applied to both austenitic and ferritic steels.

EXAMPLE 4

A sample of Type 304 mirror finish steel was initially oxidised to green and then treated to 1.2 mA/cm$^2$ in a Watts solution bath comprising 240 g/l nickel sulphate, 40 g/l nickel chloride, 40 g/l boric acid, pH 4.0 at 30° C. with no agitation. Samples treated for different periods of time were washed and dried prior to measurement of AM2 solar absorptance. Results obtained were as follows:

| Time in plating baths (mins) | Solar absorptance AM2 | Total hemispherical emissivity |
|---|---|---|
| 1 | 0.79 | 0.10 |
| 2 | 0.82 | 0.11 |
| 3 | 0.90 | 0.11 |
| 4 | 0.91 | 0.14 |
| 5 | 0.62 | 0.10 |

The reduced absorptance of the 5 minute sample corresponds to the onset of deposition of visible metallic nickel on the surface of the oxide film.

EXAMPLE 5

Samples of Type 304 stainless steel with mirror finish were initially oxidised to green and treated in the nickel sulphate solution used in Example 1 at a range of current densities for appropriate periods of time to give the highest absorptance. Results obtained were as follows:

| Current density mA/cm$^2$ | Absorptance max. AM2 |
|---|---|
| 1.27 | 0.925 |
| 1.51 | 0.938 |
| 1.90 | 0.944 |
| 2.38 | 0.955 |

This shows that the absorptance achieved may vary with the current density at which the process is carried out. At the higher current densities however the process needs greater control because of the tendency for nickel to readily plate on the surface of the film.

EXAMPLE 6

A sample of Type 304 mirror finish steel was initially oxidised to green and then treated in a bath comprising 25 g/l Pd(NH$_3$)$_2$Cl$_2$, 169 g/l ammonium chloride, NH$_3$.aq. to pH approximately 9, at room temperature. Results obtained at different current densities were as follows:

| Current density mA/cm$^2$ | Plating mins. | Solar absorptance AM2 | Total Hemispherical Emissivity |
|---|---|---|---|
| 1.2 | 1 | 0.79 | 0.11 |
| 1.2 | 1.5 | 0.81 | 0.13 |
| 1.2 | 2 | 0.86 | 0.15 |
| 1.2 | 3 | Metallic Pd on surface | |
| 2.4 | 1 | 0.92 | 0.15 |
| 2.4 | 1.5 | 0.94 | 0.19 |
| 2.4 | 2 | 0.91 | 0.19 |

The next four examples, Examples 7 to 10 inclusive, demonstrate that the process described in U.K. Pat. Nos. 1 305 636, 1 377 079 and 1 435 518 in which chromium or oxides of metals are deposited in porous films to harden them do not have a beneficial effect on solar absorptance.

EXAMPLE 7

Samples of Type 304 stainless steel coloured to blue and green were subjected to cathodic treatment in a solution of 250 g/l Cr$_2$O$_3$ and 2.5 g/l H$_2$SO$_4$ as disclosed in U.K. Pat. No. 1 305 636 and samples plated until chromium was deposited on top of the coloured stainless steel in areas of high current density. Results were as follows:

| | Solar absorptance AM2 |
|---|---|
| Blue unhardened | 0.87 |
| 5 min in plating bath | 0.88 |
| Green unhardened | 0.70 |
| 5 min in plating bath | 0.73 |

EXAMPLE 8

Chromium oxide was deposited in the pores of sample of Type 304 mirror finish stainless steel oxidised to green by hardening treatment in a solution of 250 g/l CrO$_3$ and 2.5 g/l phosphoric acid at 2.0 mA/cm$^2$ as disclosed in UK Pat. No. 1 377 079. Results obtained were:

| | Solar absorptance AM2 |
|---|---|
| Unhardened | 0.70 |
| 10 min in hardening solution | 0.71 |

EXAMPLE 9

Samples of type 304 mirror finish stainless steel were initially oxidised to blue, gold, and green and then treated in a solution of 62 g/l potassium permanganate at 2.0 mA/cm$^2$ to deposit oxides of manganese in the pores of the film as disclosed in U.K. Pat. No. 1 435 518. Results obtained were as follows:

| Initial colour | Time in hardening bath mins | Solar Absorptance AM2 |
|---|---|---|
| blue | 0.5 | 0.89 |
| | 1.0 | 0.88 |
| | 3.0 | 0.81 |
| | 5.0 | 0.81 |
| gold | 1.0 | 0.80 |
| green | 1.0 | 0.74 |

Some further examples according to the invention follow:

EXAMPLE 10

Samples of Type 304 mirror finish stainless steel oxidised to green were treated in a bath comprising 0.5 nickel nitrate solution at 4 mA/cm$^2$ at room temperature whereby nickel oxides are deposited in the pores of the film. Results obtained were as follows:

| Time in bath mins | Solar absorptance AM2 |
|---|---|
| 0.5 | 0.73 |

-continued

| Time in bath mins | Solar absorptance AM2 |
|---|---|
| 1.0 | Ni oxides on surface |

EXAMPLE 11

Five samples of Type 304 stainless steel with mirror finish were initially oxidized to green, and one sample set aside for hardness tests. Of the remaining four, three were treated by in the nickel sulphate solution in Example 1, and two of these set aside for hardness tests. The remaining treated sample and the remaining untreated sample were hardened by treatment for 10 min at 0.2 A/dm$^2$ in a solution of 250 g/l chromium trioxide and 2.5 g/l phosphoric acid. Hardness tests were then carried out by rubbing the samples with a Remington 'pencil' type erasor loaded with a 400 g weight until failure occurred. Results obtained were as follows:

| Sample | Treatment | Hardness (No. of rubs) |
|---|---|---|
| 1 | None | 5 |
| 2 | 2.5 mins at 1-27 mA/cm$^2$ Ni sulphate solution | 14 |
| 3 | 2.5 mins at 2.4 mA/cm$^2$ Ni sulphate solution | 125 |
| 4 | 2.5 mins 1.27 mA/cm$^2$ Ni sulphate solution + 0.2 A/dm$^2$ chromium trioxide/ phosphoric acid | 670 |
| 5 | 0.2 A/dm$^2$ chromium trioxide/ phosphoric acid | 670 |

EXAMPLE 12

Three samples of Type 304 austenitic stainless steel having a type 2B finish were treated by the Inco colouring process, the first to blue, the second and third to green. The first was hardened by the hardening treatment as described in Example 8 above. This gives a conventional coloured stainless steel with the optimum surface and colour for flat plate solar collectors. Such a coloured stainless steel is commercially available under the Tradename "Skysorb" (trademark) from MPD Technology Limited of Wiggin Street, Birmingham B16 OAJ. The second and third samples were treated by processes in accordance with the solution used in Example 6 above and plated with palladium for 20 seconds as 1.28 mA/cm$^2$: sample 3 in the solution used in Example 4 above and plated with nickel for 3.5 minutes at 1.2 mA/cm$^2$. After various heat treatments in air, total reflectance spectra over the wavelength range 0.3 to 2.5 μm was measured and AM2 solar absorptance calculated. The results are shown below:

| Sample Number | As Prepared | Solar absorptance AM2 | | | |
|---|---|---|---|---|---|
| | | 1 day 300° C. | 3 day 300° C. | 10 days 300° C. | 21 days 300° C. |
| 1 | .918 | .862 | .83 | .782 | .765 |
| 2 | .922 | .936 | .941 | .941 | .942 |
| 3 | .936 | .951 | .951 | .944 | .930 |

Similar samples were also subjected to heat treatment at 400° C. The results are shown below:

| Sample Number | As Prepared | Solar absorptance AM2 | |
|---|---|---|---|
| | | 1 hr 400° C. | 5 hr 400° C. |
| 1 | .918 | .721 | .709 |
| 2 | .922 | .944 | .953 |
| 3 | .936 | .945 | .918 |

EXAMPLE 13

Three samples of Type 304 stainless steel with a 2B finish were coloured at various temperatures in the range 80°–90° C. to colours varying between peacock and green. They were then nickel plated in a conventional Watts solution at 30° C. using an average current density of 1.25 mA/cm$^2$. The samples were treated, together with two samples of conventional Skysorb coloured stainless steel in vacuo at 300° C. for 10 days. Results are shown below:

| No. | Colouring Temp °C. | Colour | Colouring time min | Time Watts soln min | Total process time | AM2 solar absorptance as prepared | 10 days vacuo 300° C. |
|---|---|---|---|---|---|---|---|
| 1 | 85 | blue | 10 | — | 10 | .926 | .868 |
| 2 | 85 | blue | 10 | — | 10 | .914 | .861 |
| 3 | 80 | peacock | 24 | 4 | 28 | .946 | .938 |
| 4 | 85 | green | 16 | 5 | 21 | .942 | .939 |
| 5 | 90 | green | 12 | 5 | 17 | .942 | .948 |

It will be observed that the change of absorptance of Skysorb is about half that produced on heating in air as disclosed in Example 12. Thus the fall absorptance of Skysorb on heating in air is not solely attributable to an increase in oxide thickness. It is probable that there is a change in the composition of the oxide film on heating which causes a change in refractive index with its consequent effect on absorptance. There is insufficient evidence to decide whether the difference in absorptance of the three nickel-filled surfaces is related to the slight difference in production route.

Examples 12 and 13 show that surfaces produced by the process of the present invention may be used in various types of concentrated collectors for example in non-tracking collectors such as the CPC (compound parabolic concentrator) with a concentration of 3:1 and an operating temperature of 100° to 200° C., and in single axis tracking systems with concentration ratios in the range 5 to 20 and operating temperatures to 300° C. or even higher. They may also be used as an Infra Red camouflaging materials for cladding hot areas such as exhaust systems where optical and IR characteristics must withstand temperatures of between 150° and 200° C.

Surfaces produced by processes of the present invention have as good resistance to atmospheric corrosion, and as high performance under accelerated corrosion and stagnation tests, and the good formability of conventional stainless steel. The improvements in solar absorptance and thermal stability achieved by the present process however such surfaces make significantly more desirable for solar applications than conventional stainless steel or pigmented anodised aluminium.

Whilst in accordance with the provisions of the statute there are illustrated and described herein specific embodiments of the invention, those skilled in the art will understand that changes may be made in the form of the invention covered by the claims and that certain features of the invention may sometimes be used to further advantage without a corresponding use of the other features.

The embodiments of the invention in which an exclusive property or privilege is claimed are defined as follows:

1. A process for the production of a solar collector for operation at temperatures in the range 100° to 300° C. or more comprises immersing a stainless steel plate in a solution of chromic acid and sulphuric acid, with or without other constituents, at a temperature of about 65° C. or more, to give a colored heavily hydrated chromium-rich spinel oxide surface film of thickness of from about 0.02 to about 0.5 μm, said surface film comprising a tortuous network of interlinking pathways of effective length of about twice the film thickness, washing and drying the surface and subjecting it to DC electrolysis in a bath selected from the group comprising a nickel plating bath and a palladium plating bath, said electrolysis continuing from a time sufficient to deposit metal into the pores and thereby effect a color change of the oxide film but insufficient for metal to be deposited on the surface of the film.

2. A process as claimed in claim 1 in which the nickel bath comprises an aqueous solution of nickel sulphate, ammonium sulphate and boric acid.

3. A process as claimed in claim 1 in which the nickel bath is a Watts-type plating solution containing an aqueous solution of nickel sulphate, nickel chloride and boric acid.

4. A process as claimed in claim 1 in which the palladium bath is an aqueous solution of $Pd(NH_3)_2Cl_2$, ammonium chloride and ammonia.

5. A process as claimed in claim 1 and including the further step of hardening the metal containing film.

6. A process as claimed in claim 1 in which the absorptance of the solar collector is further increased by heating the surface at a temperature of about 300° C. or more for a period of at least 1 hour.

* * * * *